July 24, 1962          S. M. BRISTLE          3,045,647
ASSEMBLABLE SUPPORT FOR ANIMAL OILERS
Filed Feb. 4, 1959
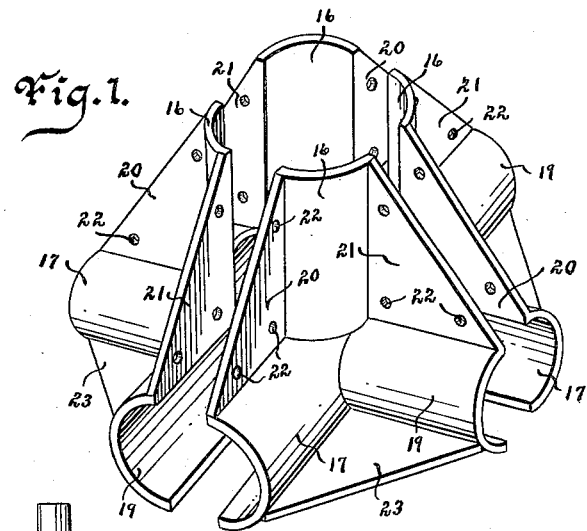
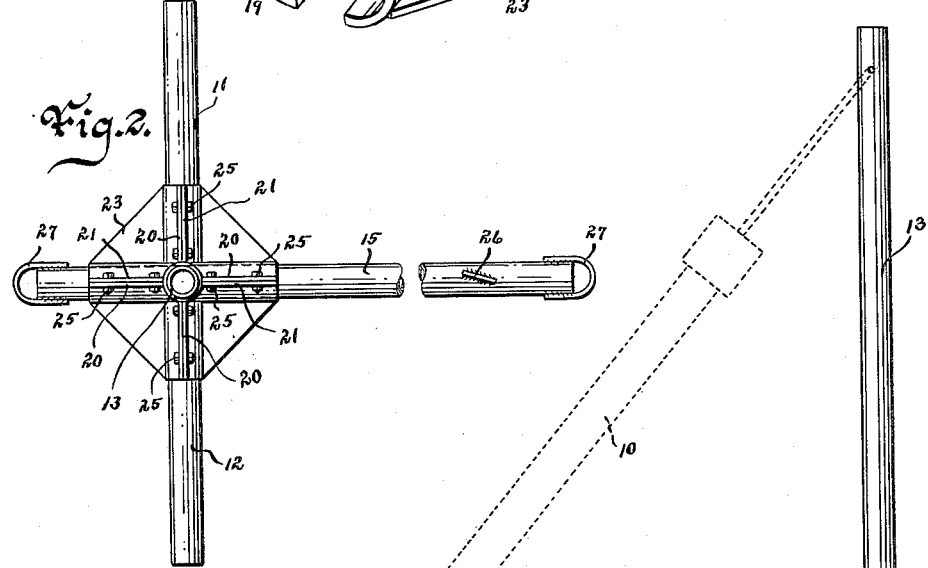
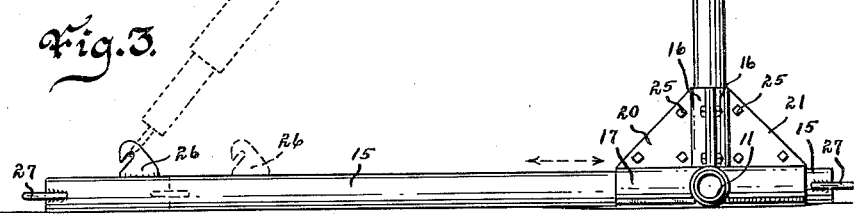
Inventor: Samuel M. Bristle
by M. Talbert Dick
Attorney
Witness
Edward P. Seeley

United States Patent Office 3,045,647
Patented July 24, 1962

3,045,647
ASSEMBLABLE SUPPORT FOR ANIMAL OILERS
Samuel M. Bristle, Woodward, Iowa
Filed Feb. 4, 1959, Ser. No. 791,126
4 Claims. (Cl. 119—157)

This invention relates to animal oilers, insecticide applicators and the like and more particularly to a base means for supporting the same in an operable position.

Animal oilers and insecticide applicators are now in general usage. Usually such devices consist of an elongated flexible member such as a chained or cable wick that extends downwardly and outwardly from a support means. Issued United States Patent No. 2,667,859 illustrates such devices. The animals rub against the elongated flexible wick which is saturated with the oil and/or insecticide. Obviously, the elongated applicator must be properly supported and quite often it is secured at its upper end to a post, tree, building or like and its lower end secured to a stake. Considerable effort has been made to provide a manufactured base and standard for these elongated applicators. Such supports are constructed of radially extending ground pipes welded together and to a vertical post pipe which forms the standard. The ground pipes must be of considerable lengths to produce a stable structure and also to provide an anchor for the lower outer end of the applicator unit. The result is a bulky, large piece of equipment that does not lend itself for shipment nor transportation.

Therefore one of the principal objects of my invention is to provide a support for elongated animal oil or like applicators that is easily and quickly assembled or disassembled at point of use, thereby facilitating transportation and storage.

A further object of this invention is to provide an animal oiler unit support that may be assembled by a single wrench tool.

A still further object of this invention is to provide an animal oiler support that is capable of adjustment.

Still further objects of my invention are to provide a support for animal oil applicator units that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective exploded view of my base unit that detachably engages the pipe lengths;

FIG. 2 is a top view of the device; and

FIG. 3 is a side view of my device in use.

An elongated oil and/or insecticide applicator herebefore mentioned is designated by the numeral 10. There are four pipe lengths in my applicator support. The two oppositely extending horizontal ones are designated by the numerals 11 and 12 and may be considered the first and second pipes, respectively. These two short pipe lengths are ground engaging ones. The vertical pipe length is designated by the numeral 13 and forms the post or standard. The numeral 15 designates the relatively long horizontal ground pipe length and may be considered the third pipe. The heart of this invention is the means for detachably securing the pipe lengths 11, 12, 13 and 15 together, with the pipe length 15 capable of being slidably adjustable thereto. The pipe 13 may be considered the fourth pipe. This connecting base unit consists of four clamping shells each a duplicate of the others as shown in FIG. 1. Each shell has a vertical one-fourth cylinder portion 16, a horizontal one-half cylinder portion 17 and a horizontal one-half cylinder portion 19 transversely arranged relative to the one-half cylinder portion 17. The inner ends of the cylinder portions 16, 17 and 19 abut each other and communicate with each other. The numeral 20 designates a web extending from one of the marginal edges of the portion 16 to the top marginal edge of the portion 17. The numeral 21 designates a similar vertical web but extending from the other marginal edge of the portion 16 to the upper marginal edge of the portion 19. The numeral 22 designates bolt holes in the webs 20 and 21. The numeral 23 designates a horizontal web extending between the lower area of the portion 17 and the lower area of the portion 19. When the base is assembled as shown in FIG. 2 there will be four pairs of adjacent webs 20 and 21. Through each pair of adjacent webs I have tightening bolts 25. There will be two in-line pairs of horizontal split cylinders formed by the one-half cylinder portions 17 and 19. Transversely of the horizontal bores thus created will be two transversely arranged bores created by the remaining two pairs of one-half cylinder portions 17 and 19 as shown in FIG. 1.

To assemble the device the elongated pipe 15 is slid completely through the first mentioned in-line bores as shown in FIG. 3. By this construction there will be two oppositely extending horizontal bores at each side of the pipe 17 for receiving the inner ends of the two short pipes 11 and 12, respectively. The vertical one-fourth cylinder portions 16 provide a vertical bore and into it the lower end of the vertical pipe 13 is placed. Obviously, by tightening all of the bolts 25 the four pipe lengths 11, 12, 13 and 15 will be rigidly clamped together as shown in FIG. 2. When the bolts 25 are in loosened condition the elongated pipe 15 may be slidably adjusted in the clamp base as shown in FIG. 3. A hook 26 is secured to the outer end portion of the pipe 15. At each end of the pipe 15 I have provided a link 27. Therefore when it is desired to move the assembled device from one location to the other, it is merely necessary to hook on to one of these links 27 with a tractor or like and sled the device to the new location. The animal treatment applicator 10 is secured at its upper end to the upper end portion of the pipe 13 and its lower end is secured to the hook 26 on the pipe 15. While the positioning of the pipe 15 in the clamping shell base may be that of an adjustment for stability, obviously, the applicator 10 may be tightened or loosened by adjustably positioning the pipe 15 in the base portion.

From the foregoing it will be seen that my support device may be easily and quickly assembled or disassembled merely by the use of a wrench. When the device is disassembled it is most compact for shipment or storage.

Some changes may be made in the construction and arrangement of my assemblable support for animal oilers without departing from the real spirit and purpose of my invention, and it is my intention to cover by my claims, any modified forms of structure or use of mechanical equivalents which may be reasonably included within their scope.

I claim:

1. In combination, a base unit, a first horizontal pipe, a means for detachably securing said first pipe to said base unit, a second horizontal pipe extending diametrically opposite of said first pipe and detachably secured to said base unit, a third horizontal pipe extending transversely of said first and second pipes and detachably slidably extending through said base unit, a fourth pipe extending vertically upwardly and detachably secured to said base unit, a hook on one end portion of said third pipe adapted to engage a member extending from said fourth pipe; said base unit consisting of four clamping shells bolted together to tightly engage said first, second, third and fourth pipes.

2. In combination, a base unit, a first horizontal pipe, a means for detachably securing said first pipe to said base unit, a second horizontal pipe extending diametrically opposite of said first pipe and detachably secured to said base unit, a third horizontal pipe extending transversely of said first and second pipes and slidably extending through said base unit, a fourth pipe extending vertically upwardly and detachably secured to said base unit; said base unit consisting of four clamping shells bolted together and tightenable on all of said pipes, and a ground engaging web plate on the bottom portion of each of the four clamping shells, to tightly engage said first, second, third and fourth pipes.

3. In combination, a base unit, a first horizontal pipe, a means for detachably securing said first pipe to said base unit, a second horizontal pipe extending diametrically opposite of said first pipe and detachably secured to said base unit, a third horizontal pipe extending transversely of said first and second pipes and slidably extending through said base unit, a fourth pipe extending vertically upwardly and detachably secured to said base unit, said base unit consisting of four clamping shells bolted together and tightenable on all of said pipes, and a ground engaging web plate on the bottom portion of each of the four clamping shells, each of said shells having two one-half horizontal cylinder portions extending in opposite directions and one-fourth vertical cylinder portions to tightly engage said first, second, third and fourth pipes.

4. In combination, a base unit, a first horizontal pipe, a means for detachably securing said first pipe to said base unit, a second horizontal pipe extending diametrically opposite of said first pipe and detachably secured to said base unit, a third horizontal pipe extending transversely of said first and second pipes and slidably extending through said base unit, a fourth pipe extending vertically upwardly and detachably secured to said base unit, said base unit consisting of four clamping shells bolted together and tightenable on all of said pipes, and a ground engaging web plate on the bottom portion of each of the four clamping shells, each of said shells having two one-half horizontal cylinder portions extending in opposite directions and one-fourth vertical cylinder portions and two vertical webs having bolt holes to tightly engage said first, second, third and fourth pipes.

References Cited in the file of this patent
UNITED STATES PATENTS

| | | |
|---|---|---|
| 1,150,781 | Louden | Aug. 17, 1915 |
| 1,623,956 | Amiot | Apr. 12, 1927 |
| 2,018,539 | Welsh | Oct. 22, 1935 |
| 2,641,225 | Kirk | June 9, 1953 |
| 2,785,653 | Caldwell | Mar. 19, 1957 |